United States Patent
Mogavero et al.

(10) Patent No.: US 10,208,716 B2
(45) Date of Patent: Feb. 19, 2019

(54) METHOD AND APPARATUS FOR OPERATING AN INTERNAL COMBUSTION ENGINE EMPLOYING FIRST AND SECOND EGR FLOWPATHS

(71) Applicant: GM GLOBAL TECHNOLOGY OPERATIONS LLC, Detroit, MI (US)

(72) Inventors: Armando Mogavero, Turin (IT); Antonio Rodio, Piemonte (IT)

(73) Assignee: GM Global Technology Operations LLC, Detroit, MI (US)

( * ) Notice: Subject to any disclaimer, the term of this patent is extended or adjusted under 35 U.S.C. 154(b) by 93 days.

(21) Appl. No.: 15/378,151

(22) Filed: Dec. 14, 2016

(65) Prior Publication Data

US 2018/0163673 A1   Jun. 14, 2018

(51) Int. Cl.

| | | |
|---|---|---|
| *F01N 3/00* | (2006.01) | |
| *F02M 26/42* | (2016.01) | |
| *F02M 26/38* | (2016.01) | |
| *F02M 26/47* | (2016.01) | |
| *F02M 26/52* | (2016.01) | |
| *F02D 41/00* | (2006.01) | |
| *F02D 41/14* | (2006.01) | |
| *F02M 26/05* | (2016.01) | |
| *F02M 26/06* | (2016.01) | |

(52) U.S. Cl.
CPC ........... *F02M 26/42* (2016.02); *F02D 41/005* (2013.01); *F02D 41/0065* (2013.01); *F02D 41/0077* (2013.01); *F02D 41/1446* (2013.01); *F02M 26/05* (2016.02); *F02M 26/06* (2016.02); *F02M 26/38* (2016.02); *F02M 26/47* (2016.02); *F02M 26/52* (2016.02); *F02D 2041/0067* (2013.01); *F02D 2200/101* (2013.01)

(58) Field of Classification Search
CPC ........ F02M 26/05; F02M 26/06; F02M 26/38; F02M 26/15; F02M 26/47; F02M 26/33; F02M 26/16; F02M 26/49; F02D 41/1446; B01D 46/448
See application file for complete search history.

(56) References Cited

U.S. PATENT DOCUMENTS

| | | | | |
|---|---|---|---|---|
| 8,230,843 B2* | 7/2012 | Kurtz | ................. | F02D 41/0065 123/568.12 |
| 2009/0165758 A1* | 7/2009 | Nishiumi | .............. | F01N 3/0871 123/568.21 |
| 2014/0130483 A1* | 5/2014 | Miyake | .................. | F01N 3/208 60/285 |

* cited by examiner

*Primary Examiner* — Audrey K Bradley
*Assistant Examiner* — Anthony Ayala Delgado
(74) *Attorney, Agent, or Firm* — Quinn IP Law

(57) ABSTRACT

An internal combustion engine system includes a first EGR valve to control flow in a first flow path, and a second EGR valve to control flow in a second flow path. A temperature sensor is disposed in the exhaust gas feedstream upstream of the exhaust purifying device, and a controller is in communication with the internal combustion engine and the temperature sensor and is operatively connected to the first and second EGR valves. The controller executes a routine to monitor the temperature of the exhaust gas feedstream upstream of the exhaust purifying device and control the first valve to control flow of exhaust gas to the air intake system via the first flow path and control the second valve to control flow of exhaust gas to the air intake system via the second flow path based upon the temperature of the exhaust gas feedstream upstream of the exhaust purifying device.

11 Claims, 3 Drawing Sheets

METHOD AND APPARATUS FOR OPERATING AN INTERNAL COMBUSTION ENGINE EMPLOYING FIRST AND SECOND EGR FLOWPATHS

INTRODUCTION

Internal combustion engines, such as are disposed on vehicles, employ exhaust aftertreatment devices to purify constituents of an exhaust gas feedstream. The exhaust aftertreatment devices operate most efficiently within predetermined temperature regions. Furthermore, recirculated exhaust gas may provide thermal energy for heating the exhaust aftertreatment devices and may also be employed to manage in-cylinder combustion temperatures.

SUMMARY

An internal combustion engine system is described and includes an internal combustion engine including an air intake system and an exhaust manifold, and an exhaust purifying device fluidly coupled to the exhaust manifold. A first EGR valve is disposed to control flow of exhaust gas between the exhaust manifold and the air intake system, wherein a first flow path is defined between the exhaust manifold, the first EGR valve and the air intake system. A second EGR valve is disposed to control flow of exhaust gas between an inlet that is disposed downstream of the exhaust purifying device and the air intake system, wherein a second flow path is defined between the inlet disposed downstream of the exhaust purifying device, the second EGR valve and the air intake system. A temperature sensor is disposed in the exhaust gas feedstream upstream of the exhaust purifying device, and a controller is in communication with the internal combustion engine and the temperature sensor and is operatively connected to the first and second EGR valves. The controller includes an instruction set that is executable to monitor, via the temperature sensor, the temperature of the exhaust gas feedstream upstream of the exhaust purifying device and control the first valve to control flow of exhaust gas to the air intake system via the first flow path and control the second valve to control flow of exhaust gas to the air intake system via the second flow path based upon the temperature of the exhaust gas feedstream upstream of the exhaust purifying device.

An aspect of the disclosure includes determining a preferred split between the first EGR flow path and the second EGR flow path based upon the temperature of the exhaust gas feedstream upstream of the exhaust purifying device.

Another aspect of the disclosure includes operating the internal combustion engine in an aftertreatment warm-up mode when the temperature of the exhaust gas feedstream is less than a low temperature threshold.

Another aspect of the disclosure includes operating the internal combustion engine in an EGR split mode when the temperature of the exhaust gas feedstream is greater than the low temperature threshold.

Another aspect of the disclosure includes selecting an initial split between the first and second EGR flow paths based upon engine speed and load parameters, and adjusting the initial split based upon the temperature of the exhaust gas feedstream.

Another aspect of the disclosure includes adjusting the initial split based upon the temperature of the exhaust gas feedstream and the engine load parameter.

Another aspect of the disclosure includes adjusting the initial split based upon the temperature of the exhaust gas feedstream only when the engine load parameter is less than a maximum load threshold.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without at some of these details. Moreover, for the purpose of clarity, certain technical material in the related art has not been described in detail in order to avoid unnecessarily obscuring the disclosure. Furthermore, the drawings are in simplified form and are not to precise scale. For purposes of convenience and clarity, directional terms may be used with respect to the drawings, and are not to be construed to limit the scope of the disclosure. Furthermore, the disclosure, as illustrated and described herein, may be practiced in the absence of an element which is not specifically disclosed herein. As employed herein, the term "upstream" and related terms refer to elements that are towards an origination of a flow stream relative to an indicated location, and the term "downstream" and related terms refer to elements that are away from an origination of a flow stream relative to an indicated location.

Figure 1:
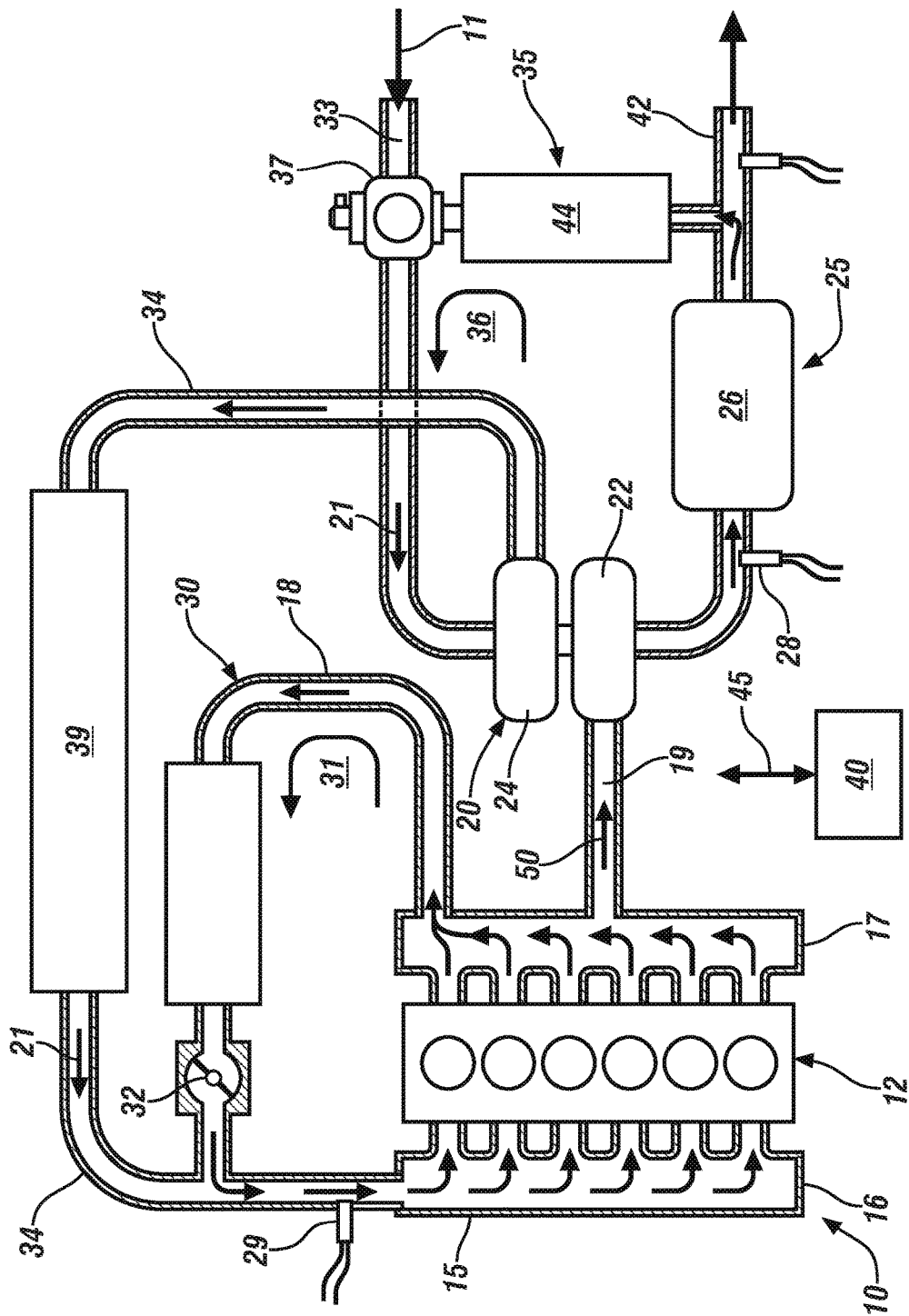
FIG. 1 schematically illustrates an internal combustion engine system including an internal combustion engine that fluidly couples to an exhaust purification system and employs first and second exhaust gas recirculation (EGR) systems, in accordance with the disclosure.

Referring to the drawings, wherein like reference numerals correspond to like or similar components throughout the several Figures, FIG. 1, consistent with embodiments disclosed herein, schematically illustrates an internal combustion engine system 10 that may be disposed on a vehicle to provide mechanical power for tractive effort and/or other needs. The internal combustion engine system 10 includes an internal combustion engine (engine) 12 that fluidly couples to an exhaust purification system 25, and employs first and second exhaust gas recirculation (EGR) systems 30 35, respectively.

The engine 12 is preferably a multi-cylinder internal combustion engine that combusts a mixture of directly-injected fuel, intake air and recirculated exhaust gas from an exhaust gas feedstream 50 to generate mechanical power. The engine 12 is configured as a compression-ignition engine as shown, although the concepts described herein may be employed on other engine configurations that employ embodiments of the exhaust purification system 25 and first and second exhaust gas recirculation (EGR) systems 30 35, which are described herein. The engine system 10 may be employed on a ground vehicle, e.g., a passenger car, truck, agricultural vehicle or a construction vehicle, on a marine vehicle, or in a stationary setting, e.g., coupled to an electric power generator.

The engine 12 includes an air intake system 15 including an intake manifold 16, a forced intake air induction device 20, a direct-injection fuel delivery system (not shown), and an exhaust manifold 17 that is disposed to entrain an exhaust gas feedstream 50 and deliver it to the exhaust purification system 25.

The air intake system 15 is disposed to channel an intake air feedstream 21 to the intake manifold 16, wherein the intake air feedstream 21 includes the intake air 11 and recirculated exhaust gas from the exhaust gas feedstream 50. The air intake system 15 preferably includes a first intake pipe 33, a compressor 24 of the forced intake air induction device 20, and a second intake pipe 34. The first intake pipe 33 fluidly couples to an inlet side of the compressor 24, and an outlet side of the compressor 24 is fluidly coupled via a second intake pipe 34 to the intake manifold 16. In one embodiment, and as shown, the second intake pipe 34 includes an air-to-air heat exchanger 39 that is employed to manage temperature of the intake air. The air intake system 15 preferably includes other components, including, e.g., an air filter, an airflow monitoring device, an air temperature sensor, and a throttle. The forced intake air induction device 20 may be a suitable device, e.g., a turbocharger or a supercharger.

The exhaust purification system 25 fluidly couples to the exhaust manifold 17 of the engine 12 via a second flow pipe 19, and includes at least one or a plurality of connected exhaust purifying devices for purifying constituents of the exhaust gas feedstream 50 prior to expulsion to ambient air. An exhaust purifying device may be a device that is configured to oxidize, reduce, selectively reduce, filter and/or otherwise treat constituents of the exhaust gas feedstream 50, including but not limited to hydrocarbons, carbon monoxide, nitrides of oxygen (NOx), and particulate matter. In the embodiment shown, the exhaust purification system 25 includes an exhaust purifying device 26, which may be a particulate filter device disposed to remove particulate matter in the exhaust gas feedstream. The second flow pipe 19 fluidly couples to a turbine 22 of the forced intake air induction device 20 such that the exhaust gas feedstream propels the turbine 22 to drive the attached compressor 24. An outlet of the turbine 22 is fluidly coupled via the second flow pipe 19 to an inlet of the exhaust purifying device 26. An outlet of the exhaust purifying device 26 fluidly couples to a third exhaust pipe 42.

The first EGR system 30 preferably includes a first EGR valve 32 that is disposed to control flow of exhaust gas to the air intake system 15 via a first exhaust pipe 18 that is disposed between the exhaust manifold 17 and the second air intake pipe 34, which define a first EGR flow path 31. The second EGR system 35 preferably includes a second EGR valve 37 that is disposed to control flow of exhaust gas to the air intake system 15 via the third exhaust pipe 42 and the first air intake pipe 33, which define a second EGR flow path 36. There may be a second heat exchanger 44 interposed in the second EGR flow path 36 to remove heat from the exhaust gas feedstream 50 prior to blending into the intake air feedstream 21 of the air intake system 15. The first EGR flow path 31 may be considered a high-pressure flow path and the second EGR flow path 36 may be considered a low-pressure flow path because the pressure differential across the first EGR valve 32 between the exhaust manifold 17 and the air intake system 15 is greater than the pressure differential across the second EGR valve 37 between the third exhaust pipe 42 and the first air intake pipe 33 under the same operating conditions. There may be other components that are employed as elements of the exhaust aftertreatment system to facilitate flow of exhaust gas from the third exhaust pipe 42 through the second EGR valve 37 to the first air intake pipe 33, such as flow valves.

The controller 40 monitors various sensing devices and executes control routines to command various actuators to control operation of the engine 12 in response to operator commands. Operator commands may be determined from various operator input devices, including, e.g., a pedal assembly that includes, by way of example, an accelerator pedal and a brake pedal. Other sensing devices associated with engine operation may include, by way of non-limiting example, a barometric pressure sensor (not shown), an ambient air temperature sensor (not shown), a VGT position sensor (not shown), an exhaust gas temperature sensor 28, an inlet air temperature sensor 29 and an engine rotational speed monitoring sensor (not shown), among others.

Engine control includes controlling various engine operating parameters, including controlling engine control states to minimize various exhaust gas constituents. Other engine control states include controlling operating parameters to warm-up the engine 12 and control heat transfer to the exhaust purification system 25 so as to effect efficacious operation thereof.

The terms controller, control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link, and is indicated by line 45. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form that is employed. A parameter is defined as a measurable quantity that represents a physical property of a device or other element that is discernible using one or more sensors and/or a physical model. A parameter can have a discrete value, e.g., either "1" or "0", or can be infinitely variable in value over a predefined range.

Figure 2:
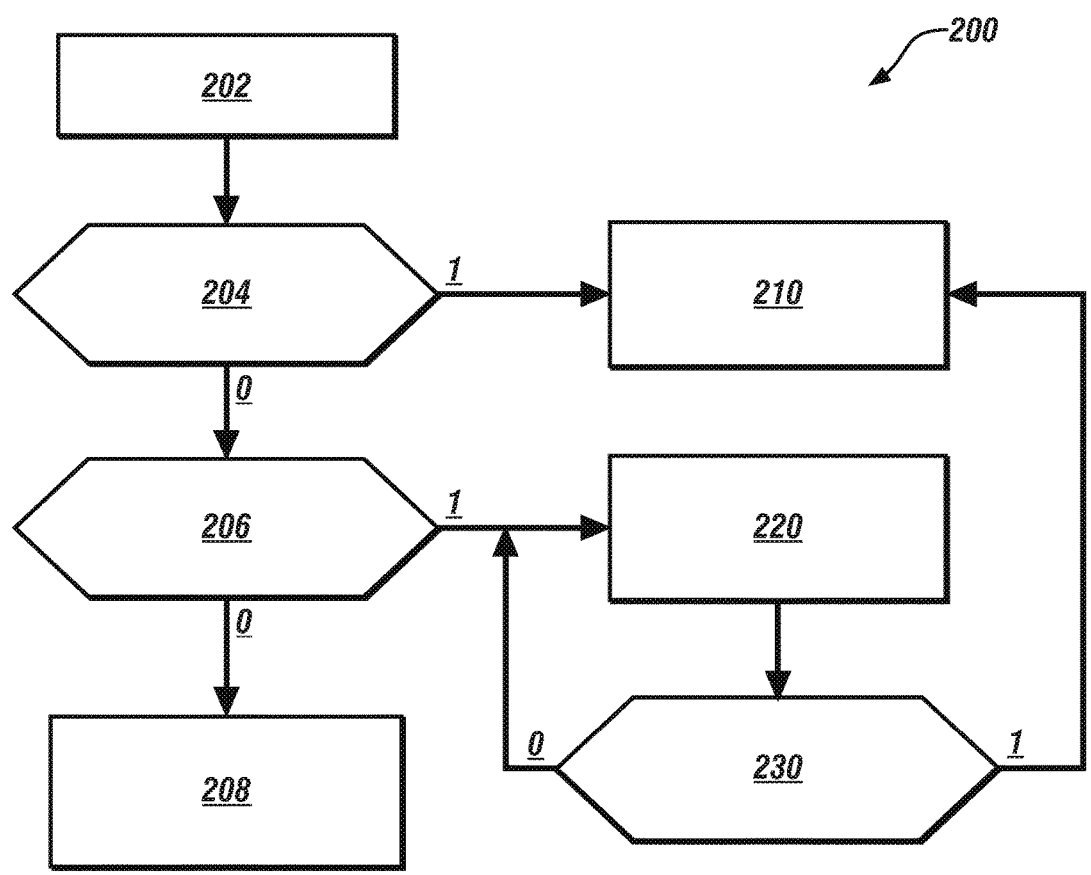
FIG. 2 schematically shows an exhaust gas temperature control routine for controlling an embodiment of the internal combustion engine system described with reference to FIG. 1, and includes a routine for controlling the first and second EGR valves to effect operation of an exhaust purifying device within a desired temperature region in a timely manner, in accordance with the disclosure.

FIG. 2 schematically shows an exhaust gas temperature control routine (routine) 200 for controlling an embodiment of the internal combustion engine system 10 described with reference to FIG. 1. Overall, the routine 200 includes monitoring operation of the engine 12, determining a temperature of the exhaust gas feedstream upstream of the exhaust purifying device 26, and controlling the first and second EGR valves 32, 37 to control flow of recirculated exhaust gas through the first and second EGR flow paths 31, 36 to achieve and/or maintain operation of the exhaust purifying device 26 within a desired temperature region in a timely manner.

Table 1 is provided as a key wherein the numerically labeled blocks and the corresponding functions are set forth as follows, corresponding to the routine 200. The teachings may be described herein in terms of functional and/or logical block components and/or various processing steps. It should be realized that such block components may be composed of hardware, software, and/or firmware components configured to perform the specified functions.

TABLE 1

| BLOCK | BLOCK CONTENTS |
| --- | --- |
| 202 | Monitor engine operation and temperatures |
| 204 | Is T_SCRF greater than T1? |

TABLE 1-continued

| BLOCK | BLOCK CONTENTS |
| --- | --- |
| 206 | Is T_SCRF greater than T2? (T2 is less than T1) |
| 208 | Operate engine in aftertreatment warm-up mode |
| 210 | Operate engine in warmed up mode |
| 220 | Operate engine in EGR split mode |
| 230 | Is T_SCRF greater than T3? (T3 is greater than T1) |

The routine 200 is preferably periodically executed during operation of the engine 12, and may proceed as follows. The steps may be executed in a suitable order, and are not limited to the order described with reference to FIG. 2.

Operation of the engine is periodically monitored (202), including monitoring an engine speed/load operating point, an inlet air temperature and an inlet air flowrate. Other monitored parameters include the exhaust gas temperature upstream of the exhaust purifying device 26 (T_SCRF), which may be monitored employing the exhaust gas temperature sensor 28. The engine speed/load operating point may be determined by monitoring a signal output from an engine crankshaft speed sensor and engine fueling commands.

The T_SCRF is compared to a first threshold T1 (204). The first threshold T1 is application-specific, and is related to an activation temperature of the exhaust purifying device 26 and its location relative to the engine 12. As such, when T_SCRF is greater than the first threshold T1 (204)(1), it indicates that the system is operating in a warmed-up steady-state mode, and the EGR control routine is focused on controlling EGR flow through the second EGR flow path 36 to minimize fuel consumption while achieving a low intake air temperature (210). When T_SCRF is less than the first threshold T1 (204)(0), it is compared to a second threshold temperature T2, which is a low temperature threshold that is associated with efficient operation of the exhaust purifying device 26, and is less than the first threshold T1 (206). When T_SCRF is less than the second threshold T2 (206)(0), it indicates that there is a need to operate in an aftertreatment warm-up mode (208), which includes executing control routines to expedite warm-up of the exhaust purifying device 26 to achieve an operating temperature region at which the exhaust purifying device 26 functions at high conversion efficiency. Control routines associated with the aftertreatment warm-up mode (208) to expedite warm-up of the exhaust purifying device 26 can include, by way of non-limiting examples, operating the engine 12 at a rich air/fuel ratio, operating the engine 12 with post-combustion fuel injection to supply unburned fuel into the exhaust gas feedstream 50 for combustion in the exhaust purifying device 26, and controlling flow of recirculated exhaust gas into the air intake system 15 to increase temperature of the intake air feedstream 21. When T_SCRF is greater than the second threshold T2 (206)(1), the EGR split routine (Step 220) is executed to manage the temperature of the intake air feedstream 21 by controlling the flow of recirculated exhaust gases through the first and second EGR flow paths 31, 36 to manage the warm-up of the exhaust purifying device 26. The EGR split routine (Step 220) is described with reference to FIG. 3.

The T_SCRF is monitored during execution of the EGR split routine (Step 220), and compared with a third threshold T3 that is greater than the first threshold (T1) (230). The third threshold T3 is associated with a fully warmed-up operation of the exhaust purifying device 26. Execution of the EGR split routine (Step 220) continues so long as T_SCRF is less than T3 (230)(0). However, when T_SCRF exceeds T3 (230)(1), the EGR control routine transitions to controlling EGR flow to minimize fuel consumption while achieving a low intake air temperature (210). In one embodiment, the first threshold T1 is 200 C, the second threshold T2 is 150 C, and the third threshold T3 is 230 C when the exhaust purifying device 26 is configured as a catalyzed particulate filter.

Figure 3:
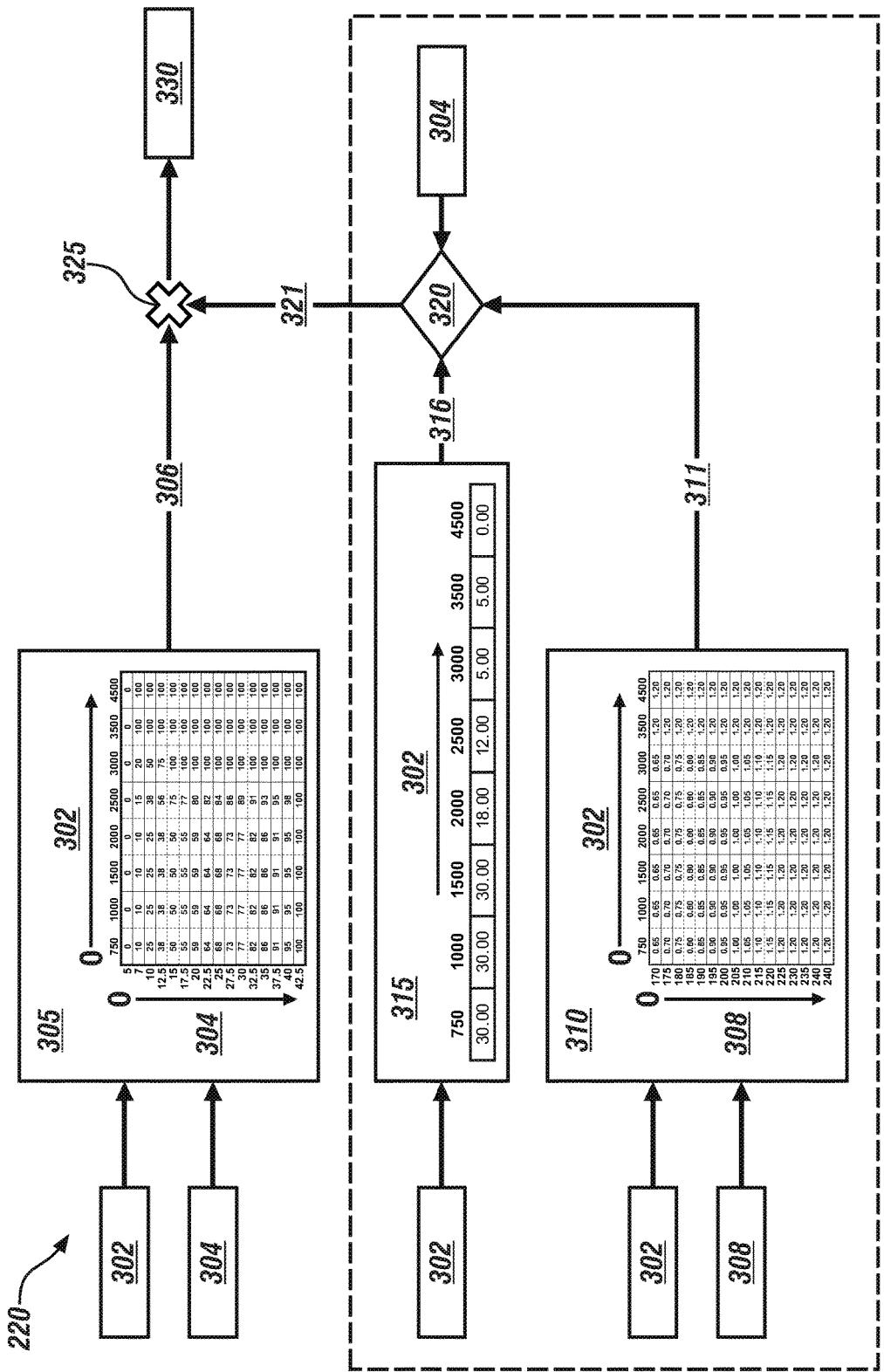
FIG. 3 schematically shows an embodiment of the EGR split routine to determine desired flow contributions from the first and second EGR valves, in accordance with the disclosure.

FIG. 3 schematically shows an embodiment of the EGR split routine (220) for controlling an embodiment of the internal combustion engine system 10 described with reference to FIG. 1, including controlling the first and second EGR valves 32, 37 to control flow of recirculated exhaust gas through the first and second EGR flow paths 31, 36. The EGR split routine (220) employs engine operating parameters including engine speed 302, engine load 304, and T_SCRF 308.

The engine speed 302 and engine load 304 are input to a first EGR split determination routine 305, which includes a calibration in the form of a two-dimensional array that yields an initial EGR split parameter 306. The initial EGR split parameter 306 may be in the form of a percentage (%) that indicates relative contributions of recirculated exhaust gases through the first and second EGR flow paths 31, 36, which are determined based upon the engine speed 302 and engine load 304.

The initial EGR split parameter 306 is preferably selected to minimize fuel consumption and is in use when the temperature in front of the exhaust system, i.e., T_SCRF 308 is greater than the first threshold T1. The adjusted EGR split is applied at a lower temperature, e.g., second threshold T2, which is less than the first threshold T1, thus preventing enabling the aftertreatment warm-up mode (208).

By way of a non-limiting example, an initial EGR split parameter 306 having a value of 0% indicates that 100% of the flow of recirculated exhaust gases passes through the first EGR flow path 31, i.e., the high-pressure flow path, and 0% of the flow of recirculated exhaust gases passes through the second EGR flow path 36, i.e., the low-pressure flow path. Similarly, an initial EGR split parameter 306 having a value of 100% indicates that 0% of the flow of recirculated exhaust gases passes through the first EGR flow path 31 and 100% of the flow of recirculated exhaust gases passes through the second EGR flow path 36.

At low speed/load operating points, the initial EGR split parameter 306 defining the flow of recirculated exhaust gases through the first and second EGR flow paths 31, 36 is predominantly through the first EGR flow path 31, i.e., the high-pressure flow path, with some incorporation of flow of recirculated exhaust gases through the second EGR flow paths 36, i.e., the low-pressure flow path. As the speed/load operating point increases, the initial EGR split parameter 306 defining the flow of recirculated exhaust gases through the first EGR flow path 31 reduces, and the flow of recirculated exhaust gases through the second EGR flow path 36 increases. At high speed/load operating points, the initial EGR split parameter 306 defining the flow of recirculated exhaust gases through the first and second EGR flow paths 31, 36 is predominantly through the second EGR flow path 36, i.e., the low-pressure flow path.

The initial EGR split parameter 306 may be subjected to modification based upon the T_SCRF 308 in conjunction with the engine speed 302. The T_SCRF 308 and engine speed 302 are input to an EGR split correction routine 310, which includes a calibration in the form of a two-dimensional array that yields an EGR split correction parameter 311. The EGR split correction parameter 311 may be in the form of a multiplier having a value between 0.0 and 2.0, and may be employed to adjust the initial EGR split parameter 306. By way of a non-limiting example, an EGR split correction parameter 311 having a value less than 1.0 decreases the magnitude of the initial EGR split parameter 306, thus increasing the percentage of flow of recirculated exhaust gases passing through the first EGR flow path 31, i.e., the high-pressure flow path. Likewise, an EGR split correction parameter 311 having a value greater than 1.0 increases the magnitude of the initial EGR split parameter 306, thus increasing the percentage of flow of recirculated exhaust gases passing through the second EGR flow path 31, i.e., the low-pressure flow path.

The engine speed (302) is also input to a third EGR split determination routine 315, which includes a calibration in the form of a one-dimensional array that yields a maximum load threshold 316, which may be in the form of a maximum fuel command. The maximum load threshold 316 indicates a maximum allowable fuel command to limit EGR split correction parameter 311, and thus limit a modification to the initial EGR split parameter 306 based upon load. The maximum load threshold 316 is intended to limit modification to the initial EGR split parameter 306 above specific loads to minimize likelihood of achieving a temperature in the intake air flow that is above a critical temperature, wherein the critical temperature is associated with material specifications for the intake manifold components and sensors. In one non-limiting embodiment, the critical temperature is 120 C.

The EGR split correction parameter 311, the maximum load threshold 316, and the engine load 304 are input to an analysis routine 320, which determines a final EGR split correction term 321. The final EGR split correction term 321 is set equal to 1.0 when the engine load 304 is greater than the maximum load threshold 316. The final EGR split correction term 321 is set equal to the EGR split correction parameter 311 when the engine load 304 is less than or equal to the maximum load threshold 316.

A final EGR split parameter 330 is determined by combining the final EGR split correction term 321 with the initial EGR split parameter 306, preferably via a multiplication operation (325).

As such, the initial EGR split parameter 306 is adjusted based upon the EGR split correction parameter 311, which is determined based upon exhaust gas temperature upstream of the exhaust purifying device 26, i.e., T_SCRF 308 when the engine load 304 is less than the maximum load threshold 316. The final EGR split parameter 330 is employed by the controller 40 to operate the engine 12 in EGR split mode to control the first and second EGR valves 32, 37, as described with reference to Step 220 of FIG. 2.

The temperature of the intake air directly affects the temperature of the exhaust gas feedstream, which can thus affect temperature and performance and conversion efficiency of an exhaust purifying device. However, increased intake air temperature may negatively affect combustion efficiency under certain circumstances. As such, recirculated exhaust gas from the first EGR flow path 31 may be advantageously added to the intake air when the temperature of the exhaust gas feedstream is less than a desired temperature. This includes during low speed/load engine operation when it may be required to increase the temperature of the exhaust gas feedstream to increase the temperature of the exhaust purifying device. Instead, the EGR management strategies described herein may reduce or eliminate the need to employ fuel-injection management strategies to effect warming of the exhaust purifying device. Such fuel-injection management strategies that are preferably avoided may include retarded-timing fuel injections, multiple fuel injection events, and post-combustion fuel injection, which may increase fuel consumption without an accompanying increase in mechanical power output from the internal combustion engine. When the exhaust purifying device has achieved a minimum acceptable temperature associated with its high efficiency operation, there can be a blend of recirculated exhaust gas from the first and second EGR flow paths 31, 36 to maintain the temperature within an allowable region and also operate to supply recirculated exhaust gas at a level that achieves high combustion efficiency.

The concepts described herein include managing the dedicated EGR system based upon the inlet aftertreatment gas temperature to increase the exhaust gas temperature with reduced need of extra fueling to maintain combustion efficiency. The exhaust gas temperature is related to the engine speed/load operation, including low-speed, low-load operating points, e.g., less than 2000 RPM and less than 5 bar BMEP, which may be common during vehicle operation in an urban environment. Managing the dedicated EGR system includes managing the dedicated EGR path, thus enabling increasing the intake manifold temperature and consequently maintaining or controlling the exhaust gas temperature base level to control the desired intake manifold temperature and the aftertreatment critical temperature while minimizing fuel consumption. This may serve to limit a need for additional fuel to reach a target temperature for exhaust purification.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special-purpose hardware-based systems that perform the specified functions or acts, or combinations of special-purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for operating an internal combustion engine fluidly coupled to an exhaust purifying device, wherein the internal combustion engine includes an intake air system and first and second EGR flow paths, the method comprising: operating the internal combustion engine such that a temperature of an exhaust gas feedstream is periodically greater than a low temperature threshold;
monitoring, via a temperature sensor, the temperature of the exhaust gas feedstream upstream of the exhaust purifying device;
controlling flow of exhaust gas to the air intake system via the first EGR flow path and controlling flow of exhaust gas to the aft intake system via the second EGR flow path based upon the temperature of the exhaust gas feedstream upstream of the exhaust purifying device, including operating the internal combustion engine in an EGR split mode when the temperature of the exhaust gas feedstream is greater than the low temperature threshold, including:
selecting an initial split between the first and second EGR flow paths based upon engine speed and engine load parameters, and
adjusting the initial split based upon the temperature of the exhaust gas feedstream and the engine load parameter;
wherein the adjusting the initial split based upon the temperature of the exhaust gas feedstream occurs only when the engine load parameter is less than a maximum load threshold.

2. The method of claim 1, further comprising determining the initial split between flow of exhaust gas to the air intake system via the first EGR flow path and flow of exhaust gas to the air intake system via the second EGR flow path based upon the temperature of the exhaust gas feedstream upstream of the exhaust purifying device.

3. The method of claim 1, further comprising operating the internal combustion engine in an aftertreatment warm-up mode when the temperature of the exhaust gas feedstream is less than a low temperature threshold.

4. The method of claim 3, further comprising operating the internal combustion engine in the EGR split mode when the temperature of the exhaust gas feedstream is greater than the low temperature threshold.

5. The method of claim 1, wherein the maximum load threshold for the engine load parameter is selected based upon an air temperature in the intake air system.

6. An internal combustion engine system, comprising:
an internal combustion engine including an air intake system and an exhaust manifold;
an exhaust purifying device fluidly coupled to the exhaust manifold;
a first EGR valve disposed to control flow of exhaust gas between the exhaust manifold and the air intake system, wherein a first EGR flow path is defined between the exhaust manifold, the first EGR valve and the air intake system;
a second EGR valve disposed to control flow of exhaust gas between an inlet that is disposed downstream of the exhaust purifying device and the air intake system, wherein a second EGR flow path is defined between the inlet disposed downstream of the exhaust purifying device, the second EGR valve and the air intake system;
a temperature sensor disposed in the exhaust gas feedstream upstream of the exhaust purifying device; and
a controller, in communication with the internal combustion engine and the temperature sensor and operatively connected to the first and second EGR valves, the controller including an instruction set, the instruction set executable to:

monitor, via the temperature sensor, the temperature of the exhaust gas feedstream upstream of the exhaust purifying device, and control the first EGR valve to control flow of exhaust gas to the air intake system via the first EGR flow path and control the second EGR valve to control flow of exhaust gas to the air intake system via the second EGR flow path based upon the temperature of the exhaust gas feedstream upstream of the exhaust purifying device, including the internal combustion engine being operated in an EGR split mode when the temperature of the exhaust gas feedstream is greater than a low temperature threshold, including:

an initial split selected between the first and second EGR flow paths based upon engine speed and engine load parameters, and the initial split adjusted based upon the temperature of the exhaust gas feedstream and the engine load parameter;

wherein the initial split is adjusted based upon the temperature of the exhaust gas feedstream only when the engine load parameter is less than a maximum load threshold.

7. The internal combustion engine of claim 6, further comprising the instruction set executable to operate the internal combustion engine in an aftertreatment warm-up mode when the temperature of the exhaust gas feedstream is less than the low temperature threshold.

8. The internal combustion engine of claim 6, further comprising the instruction set executable to operate the internal combustion engine in a warmed up mode when the temperature of the exhaust gas feedstream is greater than a high temperature threshold that is associated with a fully warmed-up operation of the exhaust purifying device.

9. The internal combustion engine of claim 6, comprising the instruction set executable to control the first EGR valve and the second EGR valve to control flow of exhaust gas to the air intake system via the second EGR flow path to minimize intake air temperature when the temperature of the exhaust gas feedstream upstream of the exhaust purifying device is greater than a first threshold.

10. The internal combustion engine of claim 6, comprising the instruction set executable to control the first EGR valve and the second EGR valve to control flow of exhaust gas to the air intake system via the second EGR flow path to minimize intake air temperature when the temperature of the exhaust gas feedstream upstream of the exhaust purifying device is greater than a third temperature threshold that is greater than the first threshold.

11. An internal combustion engine system, comprising:

an internal combustion engine including an air intake system and an exhaust manifold;

an exhaust purifying device fluidly coupled to the exhaust manifold;

a first EGR valve disposed to control flow of exhaust gas between the exhaust manifold and the air intake system, wherein a first EGR flow path is defined between the exhaust manifold, the first EGR valve and the air intake system;

a second EGR valve disposed to control flow of exhaust gas between an inlet that is disposed downstream of the exhaust purifying device and the air intake system, wherein a second EGR flow path is defined between the inlet disposed downstream of the exhaust purifying device, the second EGR valve and the air intake system;

a temperature sensor disposed in the exhaust gas feedstream upstream of the exhaust purifying device; and a controller, in communication with the internal combustion engine and the temperature sensor and operatively connected to the first and second EGR valves, the controller including an instruction set, the instruction set executable to:

monitor, via the temperature sensor, the temperature of the exhaust gas feedstream upstream of the exhaust purifying device, and control the first EGR valve to control flow of exhaust gas to the air intake system via the first EGR flow path based upon the temperature of the exhaust gas feedstream upstream of the exhaust purifying device, including the internal combustion engine being operated in an EGR split mode when the temperature of the exhaust gas feedstream is greater than a low temperature threshold, including:

an initial split selected between the first and second EGR flow paths based upon engine speed and engine load parameters, and the initial split adjusted based upon the temperature of the exhaust gas feedstream and the engine load parameter;

wherein the initial split is adjusted based upon the temperature of the exhaust gas feedstream only when the engine load parameter is less than a maximum load threshold.

* * * * *

UNITED STATES PATENT AND TRADEMARK OFFICE
CERTIFICATE OF CORRECTION

PATENT NO. : 10,208,716 B2
APPLICATION NO. : 15/378151
DATED : February 19, 2019
INVENTOR(S) : Armando Mogavero et al.

Page 1 of 1

It is certified that error appears in the above-identified patent and that said Letters Patent is hereby corrected as shown below:

In the Claims

Column 10, Line 9, in Claim 1, "exhaust gas to the aft intake system" should read --exhaust gas to the intake air system;--

Signed and Sealed this
Third Day of September, 2019

Andrei Iancu
*Director of the United States Patent and Trademark Office*